United States Patent [19]

Kaneko

[11] 3,835,550

[45] Sept. 17, 1974

[54] FREEZE-DRYING PROCESS FOR PRODUCING A DRY PLANT

[76] Inventor: Kazuko Kaneko, 5-3-7 Komazawa, Tokyo, Japan

[22] Filed: Aug. 21, 1973

[21] Appl. No.: 390,181

[30] Foreign Application Priority Data
Aug. 21, 1972  Japan.............................. 47-83422

[52] U.S. Cl. ............................................ 34/5, 34/9
[51] Int. Cl. ............................................. F26b 5/06
[58] Field of Search .......................... 34/5, 15, 92, 9

[56] References Cited
UNITED STATES PATENTS

| 2,105,688 | 1/1938 | Fessenden.............................. 34/9 X |
| 2,899,319 | 8/1959 | Powers et al. ............................. 34/5 |
| 2,906,636 | 9/1959 | Hoivik .................................. 34/9 X |
| 3,096,163 | 7/1963 | Meryman............................... 34/5 X |
| 3,571,942 | 3/1971 | Orenstein et al. ......................... 34/9 |
| 3,577,647 | 5/1971 | Shimooka ................................. 34/9 |
| 3,579,360 | 5/1971 | Rey et al................................ 34/5 X |

*Primary Examiner*—William F. O'Dea
*Assistant Examiner*—William C. Anderson
*Attorney, Agent, or Firm*—Oblon, Fisher, Spivak, McClelland & Maier

[57] ABSTRACT

A process for producing dried plants without changing their original shape which comprises substituting the water content of the plant with an organic solvent having a freeze point of −5 to 35° C and a vapor pressure of more than 4.58 mmHg at its freeze point, freezing and drying the plant.

7 Claims, No Drawings

FREEZE-DRYING PROCESS FOR PRODUCING A DRY PLANT

BACKGROUND OF THE INVENTION

1. Field of the Invention

This invention relates to dried plants, and more particularly to a process for producting decorative dried plants. By the term "plants" is intended both whole plants or plant parts, particularly the flower portion of the plants.

2. Description of the Prior Art

Conventionally, plants have been dired for display purposes by a natural drying process employing a desiccating agent such as silica gel. Another conventional process has been to press dry the plant.

However, these conventional processes for producing dried plants and flowers have various disadvantages. For example, the natural drying process often requires a lengthy period and the shape and size of the flowers are often greatly changed. Furthermore, these types of processes can only be used with limited varieties of plants such as limonium, statice, star flower, etc. Since the use of a desiccating agent requires the plant to be embedded into the desiccating agent, the plant is easily damaged either during the embedding procedure, or during the removal procedure. Thus, this process is very complicated, and the shape of the flower obtained is often distorted. Moreover, pressing procedures will not produce three dimensional dried plants.

In order to eliminate the disadvantages of such conventional procedures for producing dried plants and flower, experiments were conducted by the present inventor in which a freeze-drying method is used, such as that used in the drying of foodstuffs. However, although that process succeeded in obtaining dried plants which held their original shape, various disadvantages were encountered. The process required a low temperature of −5° to −15° C as well as a high vacuum of 0.1 to 1 mmHg and a long drying time which rendered the process unacceptable for large scale commercial operations.

A need exists, therefore, for a process for producing decorative dried plants of any variety in a simple and commercially acceptable manner without changing the original shape of the plant.

SUMMARY OF THE INVENTION

Accordingly, it is one object of this invention to provide a process for drying plants which process will not result in damage to the decorative characteristics of the plant and which will not result in distortion of the plant.

It is another object of the invention to provide a process for producing dried plants and flowers in a short time without the necessity of low temperatures or high vacuum.

Briefly, these objects and other objects of the present invention, as hereinafter will become apparent, are achieved by a process for preparing dried flowers and plants by substantially substituting for the water content of the plant, an organic solvent having a freezing point of about −5° C to about 35° C and a vapor pressure of more than 4.58 mmHg at its freezing point, followed by freeze drying the thus treated plants or flowers.

DESCRIPTION OF THE PREFERRED EMBODIMENTS

In the process of the present invention, the water content of the plant is replaced with an organic solvent having a freezing point of −5° to 35° C. and a vapor pressure of more than 4.58 mmHg at the freezing point, by either of the following methods.

In one method the plant is immersed directly in a water miscible organic solvent, such as glacial acetic acid, 1,4-dioxane, t-butyl alchohol, or the like so that all or substantially all of the water content in the plant is replaced with the organic solvent.

In the second method the water content of the plant is replaced with a water immiscible organic solvent such as benzene, cyclohexane, or the like. In this method, the plant is first immersed in to a third solvent which is miscible with both water and the organic solvent, such as alcohols eg. lower alkanols, i.e., $C_1$–$_6$ alkanols, so as to substitute the water content in the plant with the third solvent, and then the plant thus treated is immersed in the water immiscible organic solvent so as to substitute the third solvent with the organic solvent.

Therefore, in the process of the present invention, a wide variety of organic solvents, both water miscible or water immiscible, can be used, so long as the solvent has a freeze point of −5° to 35° C and a vapor pressure of more than 4.58 mmHg at the freeze point. If the freeze point of the organic solvent exceeds 35° C, the plant must be heated when it is immersed in the organic solvent, which will tend to errode the structure of the plant. If the freeze point of the organic solvent is lower than −5° C, difficulties can occur in the following freeze-dry operation. In order to carry out the drying step in a short period of time, it is required that the vapor pressure of the organic solvent at the freeze point be higher than 4.58 mmHg which is the vapor pressure of the water at its freezing point. In fact, the higher the vapor pressure of the organic solvent, the more easily will the organic solvent be removed.

The plant thus obtained by substituting the water content with the organic solvent is cooled to the freezing point of the organic solvent, and dried in its frozen state. This generally referred to as "freeze-drying." The drying may be conducted under reduced pressure or by placing the frozen plant in a stream of dry air.

It should be understood from the foregoing description that plants dried according to the present invention, may be of any variety and that the plants can be dried without loss of their original shape. In addition, the process of the present invention does not require complicated operations, such as embedding the flower in a desiccating agent, or the use of low temperatures or high vacuum, as is required in conventional freeze-drying processes. Accordingly the operation and equipment employed in the present invention is quite simple and the drying time is very short which results in a commercially economical process.

Having generally described the invention, a further understanding can be obtained by certain specific examples which are provided herein for purposes of illustration only and are not intended to be limiting unless otherwise specified.

EXAMPLE 1

Two marguerite flowers were immersed in 100 ml of glacial acetic acid having a metling point of 15° C for 4 hours. This immersing step was repeated three times so as to substitute the water content in the flowers of marguerite with glacial acetic acid.

Then, one flower was taken out of the glacial acetic acid, and after it was frozen, the glacial acetic acid was evaporated at 10° C under 5mmHg, and there was obtained a dried marguerite flower which held its original shape.

On the other hand, when the glacial acetic acid was evaporated at 25° C under 5mmHg, without freezing, the dried flower did not hold its original shape.

EXAMPLE 2

Two marguerite flowers were immersed in 100 ml of 1,4-dioxane having a melting point of 11° C for 4 hours. This immersing step was repeated three times so as to substitute the water content in the flowers with 1,4-dioxane.

Then, one flower was taken out of 1,4-dioxane, and after it was frozen, the 1,4-dioxane was evaporated at 10° C under 5mmHg for 6 hours. A dried marguerite flower was obtained which held its original shape.

On the the other hand, when 1,4-dioxane was evaporated at 25° C under 5 mmHg without freezing, a dried flower which held its original shape could not be obtained.

EXAMPLE 3

One rose flower was immersed in 100 ml of methanol for 4 hours. This immersing step was repeated three times so as to substitute the water content in the rose flower with methanol. The thus treated rose flower was immersed in 100 ml of benzene having a melting point of 5.2° C for 4 hours. This immersing step was also repeated three times so as to substitute the methanol with benzene, and after the rose was frozen, benzene was evaporated at 0° C under 5 mmHg for 4 hours.

A dried rose which retained its original shape was obtained.

EXAMPLE 4

One gladiolus flower was immersed in 100 ml of methanol for 6 hours. This immersing step was repeated twice so as to substitute the water content of the gladiolus flower with methanol. The gladiolus flower thus immersed was then immersed in 100 ml of cyclohexane having a melting point of 6.5° C for 6 hours. This immersing step was also repeated twice so as to substitute the methanol with cyclohexane, and after the gladiolus flower was frozen, the cyclohexane was evaporated at 0° C under 2 mmHg. A dried gladiolus flower was obtained which held its original shape.

EXAMPLE 5

One freesia flower was immersed in 100 ml of t-butyl alcohol having a melting point of 25.55° C for 6 hours. This immersing step was repeated three times so as to substitute the water content of the freesia flower with t-butyl alcohol.

Then, after the t-butyl alcohol immersed freesia flower was frozen, the t-butyl alcohol was removed at 20° C under 2 mmHg, and there was obtained a dried freesia flower which held its original shape.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A process for drying plants which comprises replacing the water content of a plant with an organic solvent having a freeze point of $-5°$ C to $35°$ C and a vapor pressure of more than 4.58 mmHg at the freezing point thereof, freezing said plant and removing the organic solvent therefrom.

2. A process according to claim 1, wherein the organic solvent is selected from the group consisting of glacial acetic acid, 1,4-dioxane, t-butyl alcohol, benzene and cyclohexane.

3. A process according to claim 1, wherein the water content of the plant is replaced with a third solvent which is miscible with both water and the organic solvent, and then the third solvent is substituted with the organic solvent.

4. A process according to claim 3, wherein the third solvent is an alcohol and the organic solvent is benzene or cyclohexane.

5. A process according to claim 1, wherein the water content is substituted by repeatedly immersing the plant in an organic solvent.

6. A process according to claim 3 which comprises repeatedly immersing the plant in a third solvent which is both water and solvent miscible then repeatedly immersing said plant in an organic solvent, freezing the plant and then evaporating said organic solvent.

7. A process according to claim 1, wherein the freezing step is conducted under reduced pressure or by feeding dry air.

* * * * *